2 Sheets—Sheet 1.
S. & J. H. BARLEY.
Grain and Grass Harvester.
No. 1,130.
Reissued Jan. 22, 1861.
Fig. 1,
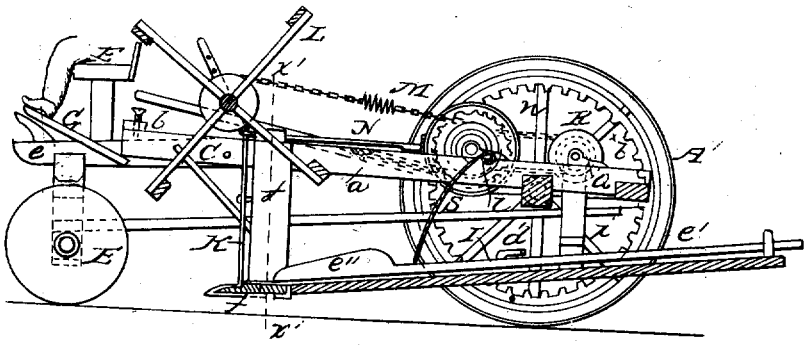
Fig. 2,
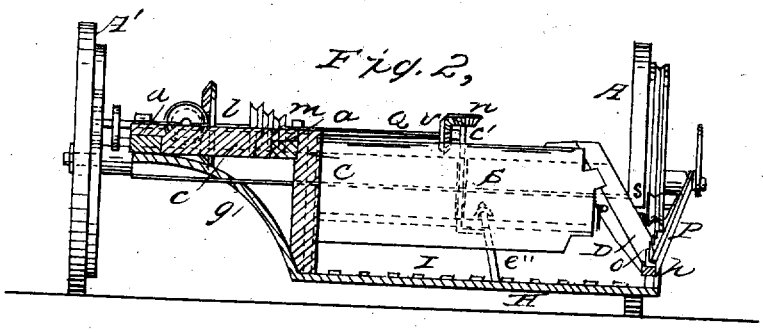
WITNESSES
Jno. Wm. Lipscomb
E. Joe Harris
INVENTORS
Samuel Barley
J. H. Barley
N. PETERS, Photo-Lithographer, Washington, D. C.

2 Sheets—Sheet 2.
S. & J. H. BARLEY.
Grain and Grass Harvester.
No. 1,130.
Reissued Jan. 22, 1861.
Fig. 3,
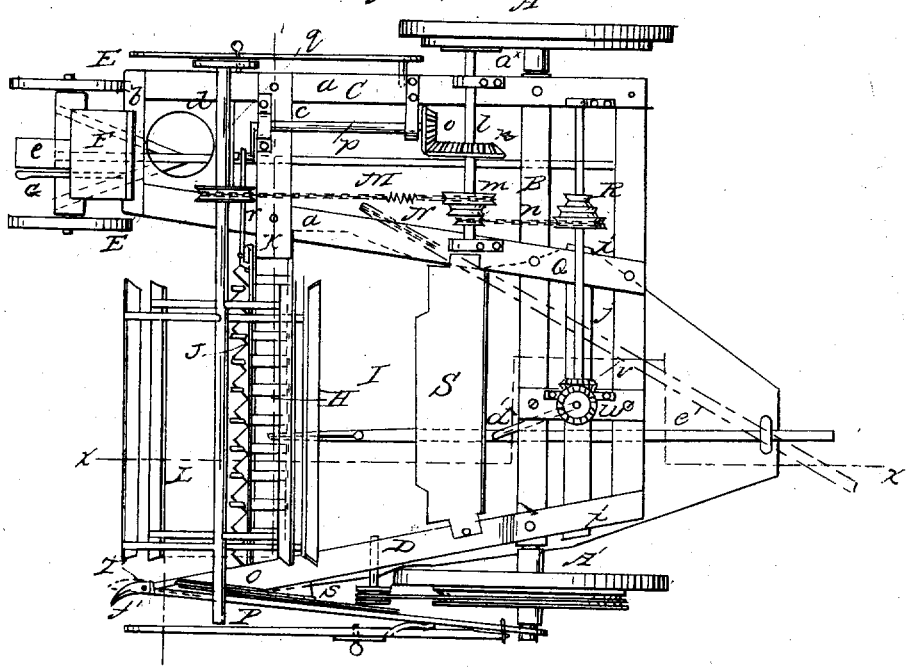
Fig. 4,
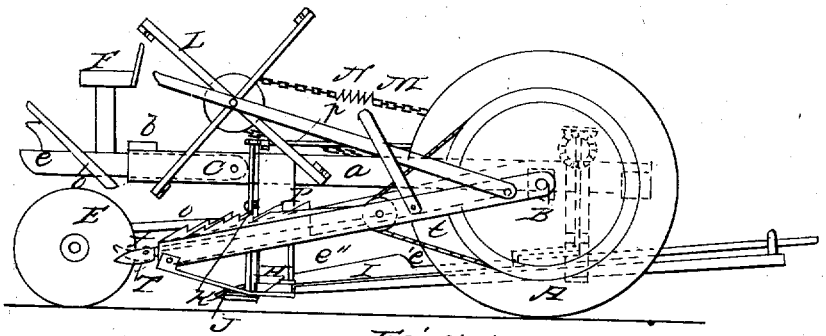
Fig. 5,
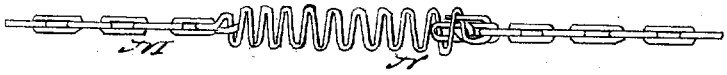
Witnesses:
John H. Hopewell
E. Rae Harris
Fig. 6,
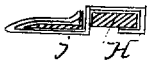
Inventors:
Samuel Barley
J. H. Barley
N. PETERS. Photo-Lithographer, Washington, D. C.

UNITED STATES PATENT OFFICE.

SAMUEL BARLEY AND J. H. BARLEY, OF LONGWOOD, MISSOURI.

IMPROVEMENT IN HARVESTERS.

Specification forming part of Letters Patent No. 28,727 dated June 19, 1860; Reissue No. 1,130, dated January 22, 1861.

*To all whom it may concern:*

Be it known that we, SAMUEL BARLEY and J. H. BARLEY, both of Longwood, in the county of Pettis and State of Missouri, have invented certain new and useful Improvements in Grain and Grass Harvesters; and we do hereby declare that the following is a full, clear, and exact description of the same, reference being had to the annexed drawings, making a part of this specification, in which—

Figure 1 is a side sectional view of our invention, taken in the line *x x*, Fig. 3; Fig. 2, a transverse vertical section of the same, taken in the line *x′ x′*, Fig. 1; Fig. 3, a plan or top view of the same; Fig. 4, a side view of the same; Fig. 5, an enlarged detached view of the belt or chain spring; Fig. 6, an enlarged transverse section of the finger-bar and sickle.

Similar letters of reference indicate corresponding parts in the several figures.

This invention consists, first, in the general construction and arrangement of the framing, substantially as hereinafter fully shown and described, whereby many advantages are obtained over other modes of construction that have passed under our observation.

The invention consists, second, in a peculiar raking device, and, third, in a divider, all arranged as hereinafter fully shown and described.

To enable those skilled in the art to fully understand and construct our invention, we will proceed to describe it.

A A′ represent the main wheels of the machine. These wheels are attached to an axle, B, to which the main frame C and divider-frame D are attached. The wheels A A′ are sufficiently large in diameter to have the framing of the machine well elevated; and to this end we have the wheels above named about five feet in diameter.

The main frame C is formed of two bars, *a* *a***, which are connected near their front ends by traverse-bars *b c*, and in the front part of the main frame a block, *d*, is fitted and secured by a joint, said block having a bar, *e*, attached to its front end, to which bar the front supporting-wheels, E E, are attached, said wheels being allowed to turn on a king-bolt, as usual. On the bar *e* the driver's seat F is placed, and to one side of the block *d* a lever, G, is attached, the inner end of the lever extending under the front part of the main frame, so that the latter, and consequently the sickle, may be raised when necessary.

To one side of the main frame C a pendent bar, *f*, is attached, said bar being braced by a curved metal bar, *g*, as shown clearly in Fig. 2.

To the under side of the divider-frame D a short pendent bar, *h*, is attached, and to the lower ends of the two pendants *f h* the finger-bar H is secured, said bar being provided with the usual fingers.

To the back part of the main frame C and divider-frame D pendants *i i* are attached, the lower parts of said pendants being connected by a traverse-bar, *j*.

To the finger-bar H and pendants *i i* a platform, I, is attached. This platform extends back as far as the back end of the framing of the machine; but it is not as wide as said framing, a space being allowed between it and the driving-wheel A′ to permit the grain being raked therefrom. (See Fig. 3.)

The axle B extends the whole width of the frame of the machine, and the outer bar of the divider-frame D at the grain end of the frame has an oblique position, as shown clearly in Fig. 3. This bar (designated by D and *a****) projects over the inner side of the shoe or lower part, *b***, of the divider. By this arrangement the grain, as it is cut, is thrown over in proper position on the platform, the oblique bar *a**** serving as a deflector, and insuring a proper separation of the cut from the standing grain. The innermost bar, *a***, at the opposite side of the frame, has also an oblique position, as shown clearly in Fig. 3. This oblique position of the bars *a**** *a*** gives a great degree of firmness to the frame, rendering the whole exceedingly stiff and rigid, and the long axle, in connection with the oblique bars in the framing, insures a steady motion of the machine, and the whole frame is clear from wheel to wheel for the management of the grain. This arrangement admits, also, of the machine being made from two to five feet narrower than other reapers, and consequently our improved machine may be transported from place to place without detaching any of the parts.

J represents the sickle, which is formed of a steel plate struck up or swaged transversely in right-angular form, as shown clearly in Fig. 6, the vertical portion *k* of the sickle bearing against the front edge of the finger-bar A.

By constructing the sickle in this way great strength is obtained with lightness.

On the upper part of the main frame C a shaft, *l*, is placed transversely, and on this shaft a cone of pulleys, *m*, is secured, and also a bevel-wheel, *n*. The wheel *n* gears into a bevel-pinion, *o*, which is placed on the back part of a shaft, *p*, on the main frame, said shaft *p* having a crank, *q*, at its front end, to which a lever, K, is connected by a rod, *r*, the lower end of lever K being connected with the sickle J. By this arrangement of the gearing it is elevated some distance above the surface of the ground, and kept free from grass, rubbish, &c., which would tend to clog or choke it if brought in contact with it. The shaft *l* is driven by means of a pinion, *a**, on said shaft gearing into toothed rim *b** on the inner side of wheel A′.

L is a reel, which may be constructed and fitted to the machine in the usual way. This reel is driven from the shaft *l* by a chain or belt, M, which is provided with a spring, N, as shown clearly in Fig. 5. The spring N is an ordinary spiral one, and is made of such strength that the belt M will always be kept at a proper degree of tension.

On the divider-frame D a small stationary saw-toothed cutter, O, is secured. This cutter is attached to the divider-frame D near its lower end, and by the side of said cutter a similar cutter, P, is fitted. The latter cutter P, however, has a reciprocating movement given it by a crank-pulley, *s*, which is driven by a belt, *t*, from the wheel A′. By means of this supplemental cutting device the grass or grain at the grain end of the machine will be prevented from clogging or choking up the end of the sickle, as all having stalks or spears will be cut by said supplemental cutting device.

On the back part of the framing of the machine a transverse shaft, Q, is placed, said shaft having a cone of pulleys, R, on it, around which a belt, *u*, passes, said belt also passing around the cone of pulleys on shaft *l*. To one end of this shaft Q a bevel-pinion, *v*, is attached. This pinion gears into a corresponding pinion, *w*, on a vertical shaft, *c′*, in the framing, said shaft *c′* having a crank, *d′*, at its lower end, to which a rake-bar, *e′*, is attached, the rake-head *e″* being attached to the front end of the rake-bar *e′*.

To the framing of the machine, and directly over the platform I, a sheet-metal guard-plate, S, is attached. This guard-plate is in a vertical or nearly vertical position. It does not quite touch the platform, sufficient space being allowed to permit the rake-bar *e′* to work below it.

To the front end of the divider-frame D a curved horn-shaped projection, T, is attached. This projection is fitted loosely on a tenon at the front end of the divider-frame, and may be turned therein and secured at any desired point of a revolution on the tenon by means of a pin, *f′*. This horn-shaped projection is a divider, and in consequence of being permitted to turn on its tenon, and secured at any desired point thereon, it is made to project more or less out from the machine, so as to bring more or less of the grain within the reach of the sickle J, or bend it outward from the sickle, as may be required, and leave a smooth, even edge at the border of the standing grain. As the machine is moved along, the rake-bar *e′* is operated by the crank *d′* and the rake-head *e″* is shoved off from the side of the platform I, between the platform and the wheel A′. This raking device, it will be seen, is perfectly automatic in its action.

In order to use the machine for cutting grass, all that is required is to detach the platform and reel, and also the raking device.

Having thus described our invention, what we claim as new, and desire to secure by Letters Patent, is—

1. The arrangement of the oblique bars *a*** *a**** of the frame, the latter bar *a**** extending over or within a vertical line with the shoe or lower part *b*** of the frame D, in connection with the long axle B, with the driving and grain wheels A A′ on either end, as and for the purpose herein set forth.

2. The arrangement of the rake bar and head *e′ e″*, to operate in combination with the guard-plate S, crank *d′*, shafts *c′* Q, and platform I, as herein shown and described.

3. We do not claim, broadly, the invention of the divider, but we do claim the arrangement of the horn-shaped divider T, to revolve so that it can be adjusted to any desired position, in the manner herein shown and described.

SAMUEL BARLEY.
J. H. BARLEY.

Witnesses:
ISAAC OPPENHEIMER,
P. T. PARSONS.